(12) United States Patent
Mose et al.

(10) Patent No.: US 9,828,023 B2
(45) Date of Patent: Nov. 28, 2017

(54) ELECTRIC POWER STEERING DEVICE

(71) Applicant: HONDA MOTOR CO., LTD., Tokyo (JP)

(72) Inventors: Ryota Mose, Wako (JP); Norifumi Tamura, Wako (JP); Yoshinobu Mukai, Wako (JP); Kyoji Hamamoto, Wako (JP); Hironori Aoyagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/081,483

(22) Filed: Mar. 25, 2016

(65) Prior Publication Data

US 2016/0288824 A1 Oct. 6, 2016

(30) Foreign Application Priority Data

Mar. 31, 2015 (JP) ................................. 2015-072862

(51) Int. Cl.
*B62D 6/00* (2006.01)
*B62D 5/04* (2006.01)

(52) U.S. Cl.
CPC ........... *B62D 5/0463* (2013.01); *B62D 5/049* (2013.01)

(58) Field of Classification Search
USPC .............................................. 701/41; 180/446
See application file for complete search history.

(56) References Cited

U.S. PATENT DOCUMENTS

| | | | | |
|---|---|---|---|---|
| 2002/0148675 A1* | 10/2002 | Higashira | ............ | B62D 5/0406 180/446 |
| 2003/0144780 A1* | 7/2003 | Recker | ................... | B62D 5/065 701/41 |
| 2004/0262073 A1* | 12/2004 | Husain | ................... | B62D 5/003 180/443 |
| 2008/0294313 A1* | 11/2008 | Aoki | .................... | B62D 5/0463 701/43 |
| 2010/0299027 A1* | 11/2010 | Aoki | .................... | B62D 5/0463 701/42 |

(Continued)

FOREIGN PATENT DOCUMENTS

JP 2007-50743 A 3/2007
JP 2012-17094 A 1/2012

(Continued)

*Primary Examiner* — Tyler Paige
(74) *Attorney, Agent, or Firm* — Westerman, Hattori, Daniels & Adrian, LLP (57) ABSTRACT

An electric power steering device includes a steering angle reference yaw rate calculation section that calculates a steering angle reference yaw rate by using a speed of a vehicle and a steering angle of a steering wheel, a torque estimation device that estimates a self-aligning torque (SAT) generated in a turning wheel of the vehicle on the basis of a measured yaw rate or the steering angle reference yaw rate, the absolute value of which is smaller, and the speed of the vehicle, and estimates a required assist torque on the basis of the estimated SAT, and an abnormality determination section that determines whether or not a steering torque sensor is abnormal. If the steering torque sensor is abnormal, an EPS control device controls drive of an assist motor using the required assist torque estimated by the torque estimation device, in place of a steering torque.

9 Claims, 4 Drawing Sheets

(56) References Cited

U.S. PATENT DOCUMENTS

| | | | |
|---|---|---|---|
| 2012/0312627 A1 | 12/2012 | Morishita et al. | |
| 2013/0253767 A1* | 9/2013 | Lee | B60W 50/04 |
| | | | 701/42 |
| 2014/0326077 A1* | 11/2014 | Yoneda | G01L 3/102 |
| | | | 73/862.333 |
| 2014/0345965 A1* | 11/2014 | Ura | B62D 5/0835 |
| | | | 180/404 |

FOREIGN PATENT DOCUMENTS

| | | |
|---|---|---|
| JP | 2012-254649 A | 12/2012 |
| WO | 2011/105154 A1 | 9/2011 |

* cited by examiner

ELECTRIC POWER STEERING DEVICE

CROSS REFERENCES TO RELATED APPLICATIONS

The present application claims priority under 35 U.S.C. §119 to Japanese Patent Application No. 2015-072862, filed Mar. 31, 2015, entitled "Electric Power Steering Device." The contents of this application are incorporated herein by reference in their entirety.

TECHNICAL FIELD

The present disclosure relates to, for example, an electric power steering device that provides a steering assist force to a steering system of a vehicle by controlling the drive of an assist motor according to a steering torque acting on a steering member.

BACKGROUND

To date, an electric power steering device that provides a steering assist force to a steering system of a vehicle by controlling the drive of an assist motor according to a steering torque acting on a steering member, such as a steering wheel, is well known (see, for example, Japanese Unexamined Patent Application Publication No. 2012-017094).

The electric power steering device according to Japanese Unexamined Patent Application Publication No. 2012-017094 controls the drive of the assist motor according to the steering torque detected by a steering torque sensor. For this reason, if the steering torque sensor enters an abnormal state, it causes a problem in controlling the drive of the assist motor.

To solve such a problem, an electric power steering device according to, for example, Japanese Unexamined Patent Application Publication No. 2012-254649 obtains, if an abnormal state in a steering torque sensor is detected, a steering axial force from a lateral G detected by a lateral G sensor and a yaw rate detected by a yaw rate sensor, in place of a steering torque detected by the steering torque sensor, and generates, in an assist motor, a target torque based on the steering axial force.

The electric power steering device according to Japanese Unexamined Patent Application Publication No. 2012-254649 can maintain a stable steering operation even if the steering torque sensor enters an abnormal state.

However, the electric power steering device according to Japanese Unexamined Patent Application Publication No. 2012-254649 needs at least a lateral G sensor in order to obtain a steering axial force. Furthermore, if the lateral G sensor enters an abnormal state, it causes a problem in controlling the drive of the assist motor.

SUMMARY

The present application describes, for example, an electric power steering device capable of maintaining a stable steering operation even if a steering torque detection section enters an abnormal state.

According to a first aspect of the present application, an electric power steering device includes a steering torque detection section that detects a steering torque acting on a steering member, a drive control section that controls drive of an assist motor according to the steering torque detected by the steering torque detection section, a measured yaw rate obtaining section that obtains a measured yaw rate of a vehicle, a vehicle speed detection section that detects a speed of the vehicle, a steering angle detection section that detects a steering angle of the steering member, a steering angle reference yaw rate calculation section that calculates a steering angle reference yaw rate by using the speed of the vehicle and the steering angle of the steering member, a torque estimation device that estimates a self-aligning torque generated by a turning wheel of the vehicle, on the basis of the measured yaw rate or the steering angle reference yaw rate, the absolute value of which is smaller, and the speed of the vehicle and estimates a required assist torque on the basis of the estimated self-aligning torque, and an abnormality determination section that determines whether or not the steering torque detection section has entered an abnormal state. If the abnormality determination section determines that the steering torque detection section has entered an abnormal state, the drive control section controls drive of the assist motor on the basis of the required assist torque estimated by the torque estimation device, in place of the steering torque detected by the steering torque detection section.

According to the first aspect, the torque estimation device estimates a self-aligning torque on the basis of the measured yaw rate or the steering angle reference yaw rate, the absolute value of which is smaller, and the speed of the vehicle and estimates a required assist torque on the basis of the estimated self-aligning torque. If the abnormality determination section determines that the steering torque detection section has entered an abnormal state, the drive control section controls the drive of the assist motor on the basis of the required assist torque estimated by the torque estimation device, in place of the steering torque detected by the steering torque detection section.

Accordingly, even if the steering torque detection section enters an abnormal state, the drive of the assist motor is controlled on the basis of the required assist torque estimated by the torque estimation device, and thereby a stable steering operation can be maintained.

Here, the purposes for the torque estimation device to estimate self-aligning torque on the basis of the measured yaw rate or the steering angle reference yaw rate, the absolute value of which is smaller, and the speed of the vehicle will be explained.

The first purpose is to ensure the reliability of the electric power steering device in a case where, for example, either of the measured yaw rate or the steering angle reference yaw rate exceeds a proper value.

Suppose that the measured yaw rate obtaining section (a yaw rate sensor, for example), which obtains a measured yaw rate of the vehicle, enters an abnormal state and outputs, as a measured yaw rate, a value exceeding a proper value, and that the torque estimation device estimates self-aligning torque on the basis of the measured yaw rate having a large value. In this case, the torque estimation device estimates, as a self-aligning torque, a value exceeding a proper value, and estimates a required assist torque on the basis of the estimated self-aligning torque. Then, the drive control section controls the drive of the assist motor on the basis of the steering torque which has been excessively estimated. As a result, there is a possibility of controlling, on basis of the required assist torque which is excessive compared with a proper value, the drive of the assist motor by using an assistive force exceeding a proper force.

Furthermore, suppose that the vehicle speed sensor or the steering angle sensor enters an abnormal state and outputs a value exceeding a proper value, that the steering angle reference yaw rate calculation section calculates a steering angle reference yaw rate on the basis of the large value, and that the torque estimation device estimates self-aligning torque on the basis of the calculated steering angle yaw rate having the large value. In this case, as with the previous case, the torque estimation device estimates, as a self-aligning torque, a value exceeding a proper value, and estimates a required assist torque on the basis of the estimated self-aligning torque. Then, the drive control section controls the drive of the assist motor on the basis of the required assist torque which has been excessively estimated. As a result, there is a possibility of controlling, on basis of the required assist torque which is excessive compared with a proper value, the drive of the assist motor by using an assistive force exceeding a proper force.

In these cases, when the electric power steering device provides an excessive steering assist force compared with a proper value to the steering system of the vehicle, such a situation is not preferable.

The second purpose is to prevent the steering member from entering a self-steer state in a case where, for example, the vehicle travels and turns on a positive-cant road. The positive-cant road is a road which is inclined in a width direction of the road with respect to a traveling direction of the vehicle, and in which the position in an outer direction of the vehicle turning thereon is higher than the position in an inner direction thereof. The state where the steering member enters a self-steer state is a state where the steering member tends to turn into a direction that the driver does not intend.

When the vehicle travels and turns on a positive-cant road, the measured yaw rate becomes the same value as the measured yaw rate on a flat road, whereas, since the steering angle becomes a value smaller than that of the steering angle on a flat road, the steering angle reference yaw rate becomes a value smaller than that of the steering angle reference yaw rate on a flat road according to an actual situation of the road environment. In short, in a case where the vehicle travels and turns on a positive-cant road, the measured yaw rate becomes a value exceeding a proper value.

Suppose that, at this time, the torque estimation device estimates self-aligning torque on the basis of the measured yaw rate that is a value exceeding a proper value. In this case, the torque estimation device estimates a value exceeding a proper value as the required assist torque. As a result, the drive control section is likely to control the drive of the assist motor by using an assistive force exceeding a proper assistive force on the basis of the required assist torque, which has been excessively estimated.

In such a case, when the electric power steering device provides an excessive steering assist force compared with a proper value to the steering system of the vehicle, the steering member may enter a self-steer state, such a situation is not preferable.

According to the first aspect, the torque estimation device is configured to estimate a self-aligning torque on the basis of a measured yaw rate or a steering angle reference yaw rate, the absolute value of which is smaller, and a speed of the vehicle, and to estimate a required assist torque on the basis of the estimated self-aligning torque.

Accordingly, even in a case where the measured yaw rate or the steering angle reference yaw rate becomes an abnormal value (large value) compared with a proper value, the effects of the abnormal value can be avoided in advance, and thereby favorable steering sensation is sustained and the reliability of the electric power steering device can be ensured.

Furthermore, according to a second aspect of the present application, the electric power steering device according to the first aspect further includes a rotation information obtaining section that obtains rotation information of the assist motor, wherein, if the abnormality determination section determines that the steering torque detection section has entered an abnormal state, the drive control section controls drive of the assist motor on the basis of the required assist torque estimated by the torque estimation device and the rotation information of the assist motor obtained by the rotation information obtaining section, in place of the steering torque detected by the steering torque detection section.

According to the second aspect, if the abnormality determination section determines that the steering torque detection section has entered an abnormal state, the drive control section controls the drive of the assist motor on the basis of the required assist torque estimated by the torque estimation device and the rotation information of the assist motor obtained by the rotation information obtaining section, in place of the steering torque detected by the steering torque detection section.

The rotation information of the assist motor is information on the rotation of the assist motor, including both rotation angle information and rotation speed information of the assist motor.

According to the second aspect, an improved steering sensation is obtained in addition to the effects of operation of the first aspect of the present application.

BRIEF DESCRIPTION OF THE DRAWINGS

The advantages of the disclosure will become apparent in the following description taken in conjunction with the following drawings.

DETAILED DESCRIPTION

Electric power steering devices according to the embodiments of the present application will be described in detail with reference to the drawings.

Note that, in the drawings, members having similar functions or members having corresponding functions are basically given the same numerical designations. In addition, for convenience of explanation, members may be schematically illustrated by exaggerating or changing the sizes and the shapes thereof.

[Configuration of Steering Device 10 Linked to Electric Power Steering Device 11 According to the Embodiments of the Present Application]

Figure 1:
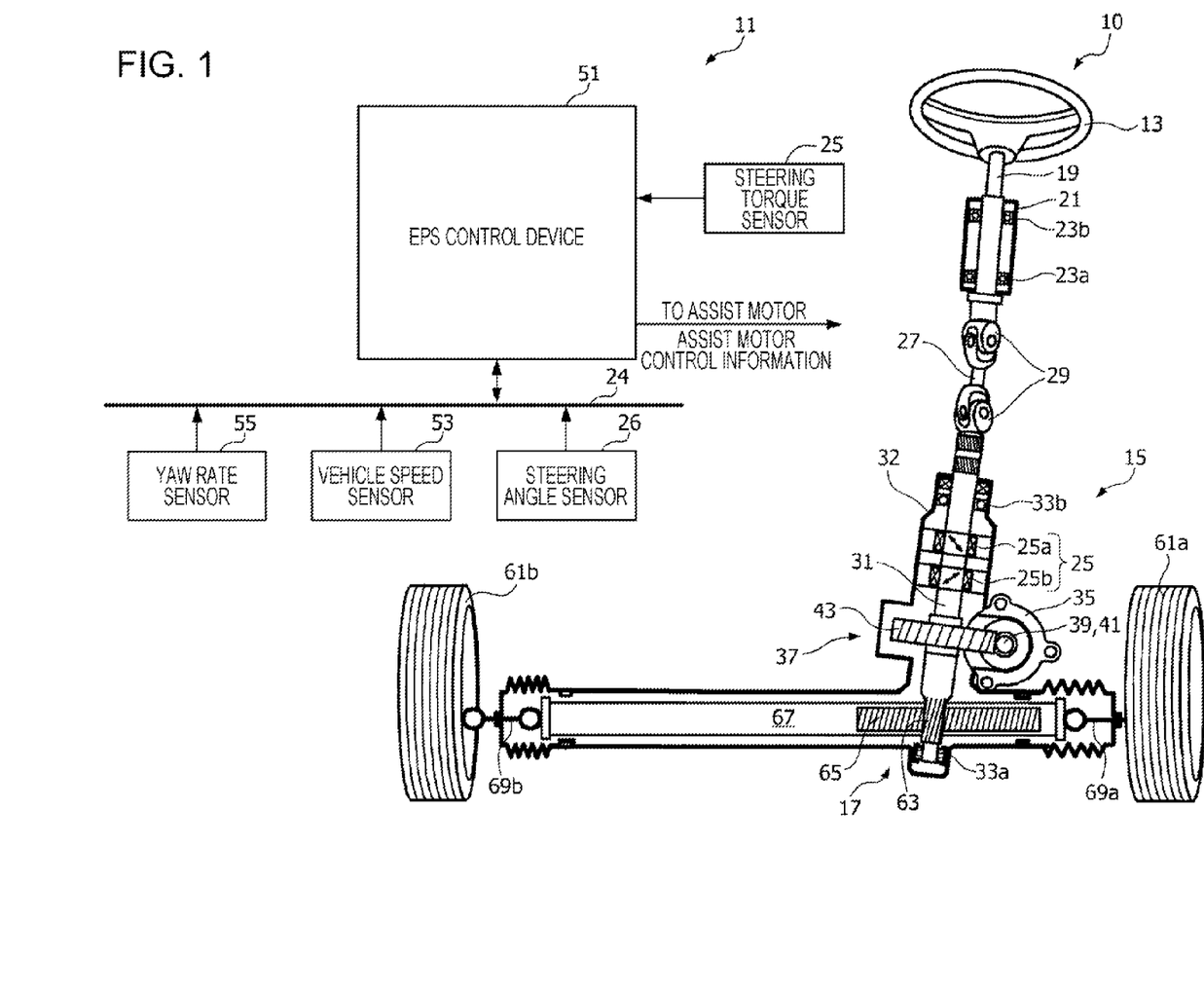
FIG. 1 is a schematic configuration of an electric power steering device according to an embodiment.

Before explaining an electric power steering device 11 according to the embodiments of the present application, the configuration of a steering device 10 linked to the electric power steering device 11 will be explained with reference to FIG. 1. FIG. 1 is a schematic configuration of the electric power steering device according to an embodiment of the present application.

As illustrated in FIG. 1, the steering device 10 is provided with a steering wheel 13, a steering assist device 15, and a turning device 17.

The steering wheel 13 corresponding to "the steering member" of the present, application is a member that is operated by a driver to change the travel direction of a vehicle (not shown) to a desired direction. A center portion of the steering wheel 13 is connected to one end of a steering shaft 19. The steering shaft 19 is rotatably supported with respect to an upper housing 21 via bearings 23a and 23b respectively installed on the lower and upper portions of the upper housing 21.

The steering shaft 19 is provided with a steering angle sensor 26 that detects a steering angle of the steering wheel 13. Steering angle information detected by the steering angle sensor 26 is supplied to an electric power steering (EPS) control device 51 via a communication medium 24.

The other end of the steering shaft 19, the end being opposite to the one end at which the steering wheel 13 is provided, is connected to a turning shaft 31 via a middle shaft section 27 and a pair of universal joints 29 in series. The turning shaft 31 is rotatably supported with respect to a lower housing 32 via bearings 33a and 33b respectively installed on the lower and upper portions of the lower housing 32.

A magnetostrictive steering torque sensor 25 is installed inside the lower housing 32 so as to surround the turning shaft 31. A part of the turning shaft 31, the part facing the steering torque sensor 25, is provided with a magnetostrictive film (not shown) made of, for example, a Ni-Fe plating so as to cover the whole circumference in a circumferential direction of the turning shaft 31. The steering torque sensor 25 has a function to detect the magnitude of steering torque, which is input to the turning shaft. 31 via the steering wheel 13, the steering shaft 19, the middle shaft section 27, and the pair of universal joints 29, by using first and second coils 25a and 25b of solenoid type, for example, in a non-contact state with respect to the turning shaft 31.

Now, the principle of detection of a steering torque by the magnetostrictive steering torque sensor 25 will be explained. When steering torque is input to the turning shaft 31, strain in a tension direction (+45° direction) and strain in a compression direction (−45° direction) are generated on the surface of the turning shaft 31. At this time, magnetic permeability in the tension direction increases while magnetic permeability in the compression direction decreases. This phenomenon is called a "magnetostrictive effect". The first coil 25a is provided in such a manner that a magnetic flux flows in a direction in which the magnetic permeability increases. Meanwhile, the second coil 25b is provided in such a manner that a magnetic flux flows in a direction in which the magnetic permeability decreases.

Then, inductance increases in the first coil 25a, which is provided in such a manner that the magnetic flux flows in the direction in which the magnetic permeability increases, while inductance decreases in the second coil 25b, which is provided in such a manner that the magnetic flux flows in the direction in which the magnetic permeability decreases. The first coil 25a and the second coil 25b are bridge-connected, and a differential voltage is amplified in a differential amplification circuit (not shown) and then output. Consequently, an output voltage (steering torque information) proportional to the steering torque can be detected.

The steering torque information detected by the steering torque sensor 25 is supplied to an electric power steering control device (hereinafter also referred to as "EPS control device") 51, which will be described later. Note, however, that a configuration in which the steering torque information is supplied to the EPS control device 51 via a communication medium 24, such as a controller area network (CAN), may be employed.

The steering assist, device 15 provided on the turning shaft 31 has a function to provides an assistive force related to manual operation of the steering wheel 13 by a driver. The steering assist device 15 is provided with an assist motor 35 that, supplies an assistive force (steering reaction force) for reducing (including response adjustment) the steering torque of the steering wheel 13 during manual operation by the driver, and a deceleration mechanism 37.

The deceleration mechanism 37 has a worm gear 41 connected to an output shaft, section 39 of the assist motor 35, and a worm wheel gear 43 engaged with the worm gear 41. The worm wheel gear 43 is provided on a middle portion of the turning shaft 31 in a shaft direction so as to rotate together with the turning shaft 31. The deceleration mechanism 37 is provided so as to be interposed between an output shaft section 39 of the assist motor 35 and the turning shaft 31.

Thereby, the worm wheel gear 43 serves to transmit the drive force of the assist motor 35 to the steering wheel 13 via the deceleration mechanism 37, the turning shaft 31, and the steering shaft 19, etc., as well as to turning wheels 61a and 61b via a turning device 17.

The assist motor 35 is integrally provided with a resolver (not shown) that detects and outputs information on the rotation angle of the assist motor 35. The rotation angle information of the assist motor 35 detected by the resolver is supplied to the EPS control device 51.

The turning device 17 has a function to transmit the steering torque input by the driver via the steering wheel 13 and the steering shaft 19 to the turning wheels 61a and 61b. The turning device 17 includes a pinion gear 63 provided on the turning shaft 31, a rack shaft 67 that has rack teeth 65 engaged with the pinion gear 63 and is capable of producing a reciprocating motion in a vehicle width direction, tie rods 69a and 69b respectively provided on both ends of the rack shaft 67, and turning wheels 61a and 61b rotatably provided via the respective tie rods 69a and 69b.

[Configuration of Electric Power Steering Device 11 of the Embodiments of the Present Application]

Next, the configuration of the electric power steering device 11 according to the embodiments of the present application will be explained with reference to FIG. 1.

As illustrated in FIG. 1, the electric power steering device 11 includes the steering assist device 15 and the EPS control device 51. The EPS control device 51 is connected to the communication medium 24. In addition to the steering angle sensor 26, a vehicle speed sensor 53 that detects a speed (vehicle speed) of the vehicle in which the speed sensor 53 is mounted and a yaw rate sensor 55 that detects and outputs a measured yaw rate of the vehicle in which the yaw rate sensor 55 is mounted are connected to the communication medium 24.

(Configuration of EPS Control Device 51)

Figure 2:
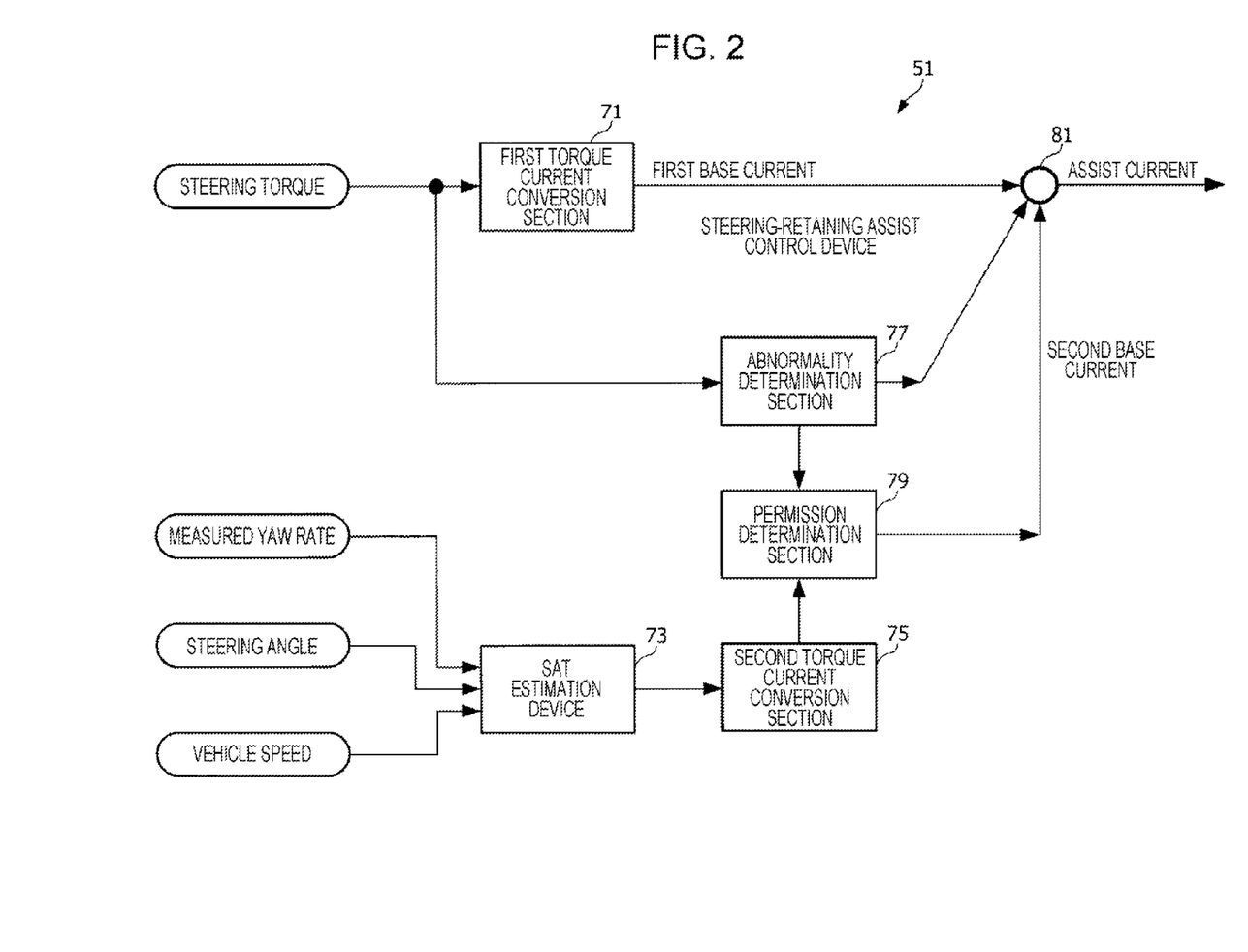
FIG. 2 is a block diagram of an EPS control device provided in the electric power steering device.
Figure 3:
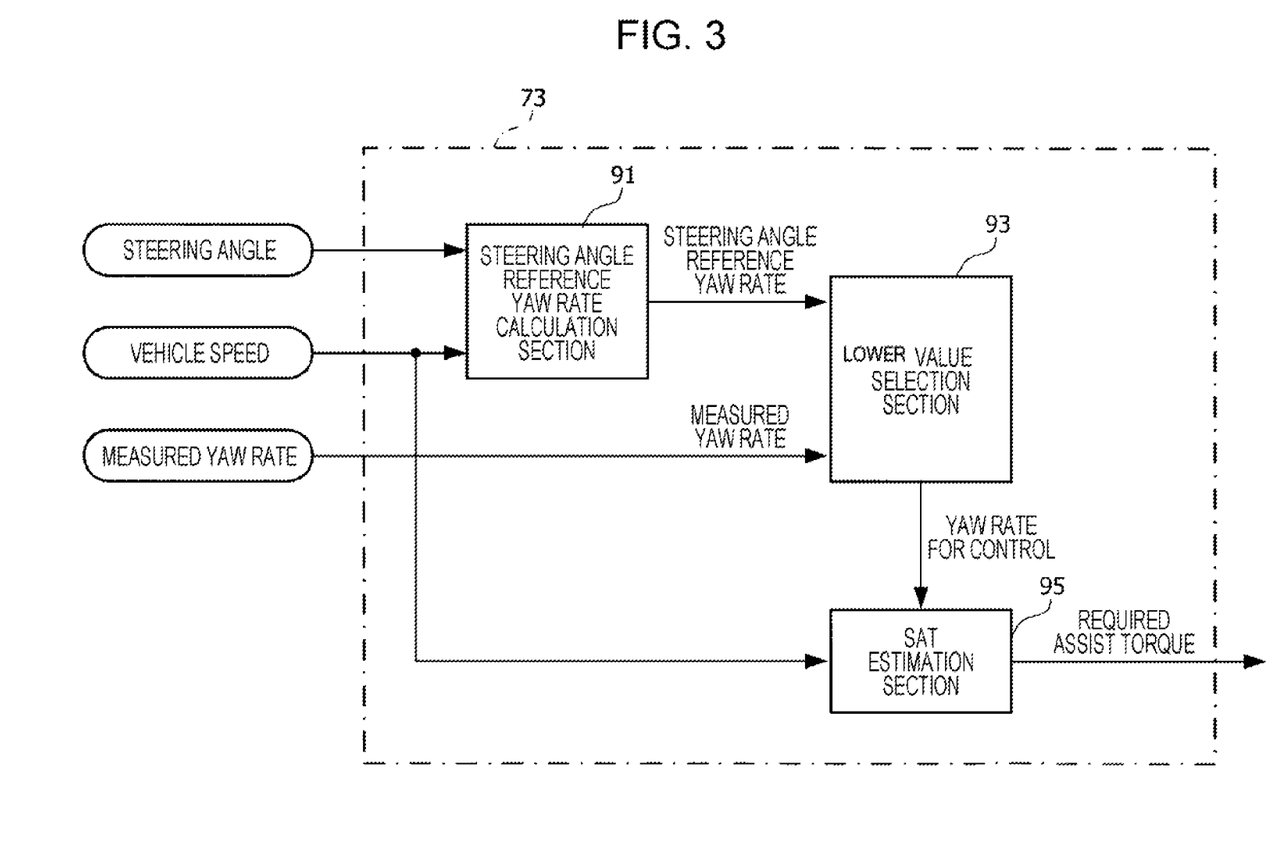
FIG. 3 is a block diagram of an SAT estimation device provided in the EPS control device.

Next, the EPS control device 51 will be explained with reference to FIGS. 2 and 3. FIG. 2 is a block diagram of the EPS control device 51 provided in the electric power steering device 11. FIG. 3 is a block diagram of a self-aligning torque (SAT) estimation device 73 provided in the EPS control device 51.

The EPS control device 51 functions as a rotation information obtaining section that obtains rotation information (including both rotation angle information and rotation speed information) of the assist motor 35 detected by the resolver. In addition, the EPS control device 51 has a function to reduce the steering torque required when the driver turns the steering wheel 13 by referring to various information, such as steering torque information, which is detected continuously by the steering torque sensor 25, steering angle information, which is detected by the steering angle sensor 26, and vehicle speed information, which is detected by the vehicle speed sensor 53, in order to calculate a value of a target current (assist current) to be supplied to the assist motor 35, and by performing control in such a manner that a value of an actual current flowing in the assist motor 35 follows that of the assist current. The EPS control device 51 includes a microcomputer that performs arithmetic processing, and various peripheral circuits including a drive control circuit for the assist motor 35.

To be more specific, the EPS control device 51 is provided with a first torque current conversion section 71, an SAT estimation device 73, a second torque current conversion section 75, an abnormality determination section 77, a permission determination section 79, and a switch section 81, as illustrated in FIG. 2.

The first torque current conversion section 71 has a function to convert the steering torque information detected by the steering torque sensor 25 into a value of a first base current for the assist motor 35. The first base current is a supply current to the assist motor 35, the supply current corresponding to the steering torque information detected by the steering torque sensor 25. The first base current for the assist motor 35 converted by the first torque current conversion section 71 is output to the switch section 81.

The SAT estimation section 73 has a function to estimate self-aligning torque (hereinafter also referred to as "SAT") generated by turning wheel (not shown) of the vehicle as well as to estimate, on the basis of the estimated SAT, a steering assist force (required assist torque) to be applied to the steering wheel 13. The inside structure of the SAT estimation device 73 will be described in detail below.

The SAT estimation device 73 includes a steering angle reference yaw rate calculation section 91, a lower value selection section 93, and an SAT estimation section 95, as illustrated in FIG. 3.

The steering angle reference yaw rate calculation section 91 has a function to calculate a steering angle reference yaw rate by using the steering angle data detected by the steering angle sensor 26 and the vehicle speed data detected by the vehicle speed sensor 53. The steering angle reference yaw rate calculated by the steering angle reference yaw rate calculation section 91 is output to the lower value selection section 93.

The lower value selection section 93 selects from the measured yaw rate data that is actually measured by the yaw rate sensor 55 and the steering angle reference yaw rate calculated by the steering angle reference yaw rate calculation section 31 the yaw rate data having a lower value. The yaw rate data selected here is output to the SAT estimation section 95 as yaw rate data for control.

The SAT estimation section 95 has a function to estimate self-aligning torque (SAT) generated by a turning wheel of the vehicle as well as to estimate a required assist torque on the basis of the estimated SAT. More specifically, the SAT estimation section 95 estimates SAT generated by a turning wheel of the vehicle during turning on the basis of the yaw rate data for control (the measured yaw rate or the steering angle reference yaw rate, the absolute value of which is smaller) and the vehicle speed data while taking SAT constants derived from specifications of the vehicle into consideration, and also estimates a required assist torque for canceling the SAT obtained by the aforementioned estimation. Here, the self-aligning torque can be estimated as a function of the yaw rate data for control, the vehicle speed data, and the SAT constants, for example.

Note that, when estimating a self-aligning torque, a well-known method, as disclosed in, for example, Japanese Unexamined Patent Application Publication No. 2007-50743, the entire contents of which are incorporated herein by reference, may be used.

The required assist torque obtained as above is output to the second torque current conversion section 75, which is positioned after the SAT estimation device 73 in FIG. 2.

The second torque current conversion section 75 has a function to convert the required assist torque estimated by the SAT estimation device 73 into a value of a second base current for the assist motor 35. The second base current is a supply current to the assist motor 35, the supply current corresponding to the required assist torque estimated by the SAT estimation device 73. The second base current for the assist motor 35 converted by the second torque current conversion section 75 is output as needed to the switch section 81 via the permission determination section 79.

The abnormality determination section 77 has a function to diagnose whether or not the steering torque sensor 25 has entered an abnormal state. A diagnostic result of the steering torque sensor 25 determined by the abnormality determination section 77 is transmitted to the permission determination section 79.

The permission determination section 79 functions as a gate that determines whether or not to output the second base current for the assist motor 35 converted by the second torque current conversion section 75 to the switch section 81 provided in a subsequent stage. To be more specific, if the diagnostic result of the steering torque sensor 25 determined by the abnormality determination section 77 is abnormal, the permission determination section 79 decides permission of output of the second base current for the assist motor 35 converted by the second torque current conversion section 75 to the switch section 81 in the subsequent stage.

Note that the permission determination section 79 may be configured in such a manner that, if the diagnostic result of the steering torque sensor 25 determined by the abnormality determination section 77 is abnormal, the second base current value for the assist motor 35 is output to the switch section 81 so as to gradually increase (or gradually decrease) in a predetermined delay time period. This is because, if the steering assist force for the steering wheel 13 suddenly changes, the driver may experience discomfort. The delay time period may be set to be variable according to the magnitude of the absolute value of the second base current, in such a manner that the delay time period in a case where the absolute value of the second base current is larger becomes longer than the delay time period in a case where the absolute value of the second base current is smaller.

The switch section 81 selectively outputs as the assist current to be supplied to the assist motor 35 by switching between the first base current value for the assist motor 35 converted by the first torque current conversion section 71 and the second base current value for the assist motor 35 converted by the second torque current conversion section 75.

To be more specific, if the diagnostic result of the steering torque sensor 25 determined by the abnormality determination section 77 is not abnormal, the switch section 81 selectively switches and outputs, as the assist current to be supplied to the assist motor 35, the first base current value for the assist motor 35 converted by the first torque current conversion section 71.

On the other hand, if the diagnostic result of the steering torque sensor 25 determined by the abnormality determination section 77 is abnormal, the switch section 81 selectively switches and outputs, as the assist current to be supplied to the assist motor 35, the second base current value for the assist motor 35 converted by the second torque current conversion section 75.

The EPS control device 51 performs control in such a manner that a value of an actual current flowing in the assist motor 35 follows that of the assist current for the assist motor 35, the assist current being switched by the switch section 81, thereby operating so as to reduce the steering torque required when the driver turns the steering wheel 13.

[Operation of EPS Control Device 51]

Figure 4:
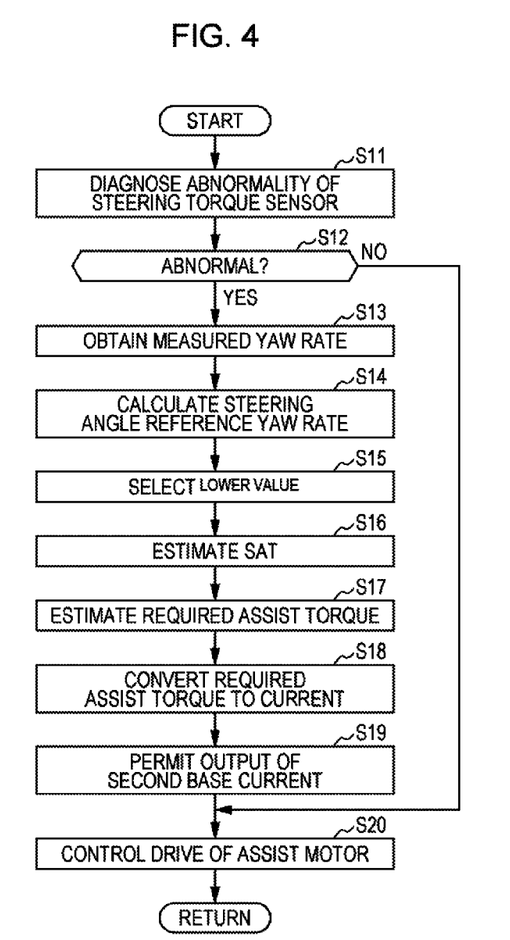
FIG. 4 is a flowchart for explaining operation of the EPS control device.

Operation of the EPS control device 51 will be explained with reference to FIG. 4. FIG. 4 is a flowchart for explaining operation of the EPS control device 51.

In step S11, the abnormality determination section 77 diagnoses whether or not the steering torque sensor 25 has entered an abnormal state.

In step S12, from a diagnostic result in step S11 of the steering torque sensor 25, the abnormality determination section 77 determines whether or not the steering torque sensor 25 has entered an abnormal state.

From a determination result in step S12, if the steering torque sensor 25 is diagnosed as having no abnormality (NO in step S12), the EPS control device 51 causes the processing flow to proceed to step S18.

Meanwhile, from the determination result in step S12, if the steering torque sensor 25 is diagnosed as having an abnormality (YES in step S12), the EPS control device 51 causes the processing flow to proceed to the next step S13.

In step S13, the EPS control device 51 obtains a measured yaw rate detected by the yaw rate sensor 55.

In step S14, the steering angle reference yaw rate calculation section 91 calculates a steering angle reference yaw rate by using the steering angle data detected by the steering angle sensor 26 and the vehicle speed data detected by the vehicle speed sensor 53.

In step S15, the lower value selection section 93 selects among the measured yaw rate data actually measured by the yaw rate sensor 55 and the steering angle reference yaw rate calculated by the steering angle reference yaw rate calculation section 91, the yaw rate data having a lower value, and outputs, as the yaw rate data for control, the selected yaw rate data to the SAT estimation section 95.

In steps S16 and S17, the SAT estimation section 35 estimates, on the basis of the yaw rate data for control and the vehicle speed data, a self-aligning torque generated by a turning wheel of the vehicle, and also estimates a required assist torque that cancels out the self-aligning torque obtained by the aforementioned estimation.

In step S18, the second torque current conversion section 75 converts the required assist torque, which has been output from the SAT estimation device 73, into a second base current for the assist motor 35.

In step S19, since the diagnostic result of the steering torque sensor 25 determined by the abnormality determination section 77 is abnormal (YES in step S12), the permission determination section 79 decides permission of output of the second base current for the assist motor 35 converted in step S18 to the switch section 81. Then, the switch section 81 selectively switches and outputs, as the assist current to be supplied to the assist motor 35, the second base current value for the assist motor 35 converted in step S18.

In step S20, the EPS control device 51 controls the drive of the assist motor 35 in such a manner that the value of the actual current flowing in the assist motor 35 follows that of the assist current (second base current value) for the assist motor 35, the assist current being switched by the switch section 81. Thereby, the steering torque required when the driver turns the steering wheel 13 is reduced. Then, the EPS control device 51 returns the processing flow to step S11, and performs subsequent processing sequentially.

[Effects of Operation of Electric Power Steering Device 11 According to the Embodiments of the Present Application]

Next, the effects of operation of the electric power steering device 11 according to the embodiments of the present application will be explained.

The electric power steering device 11 according to the first aspect is provided with the steering torque sensor (steering torque detection section) 25 that detects steering torque acting on the steering wheel (steering member) 13, and the EPS control device (drive control section) 51 that controls the drive of the assist motor 35 according to the steering torque detected by the steering torque sensor 25.

The electric power steering device 11 according to the first aspect includes the yaw rate sensor (measured yaw rate obtaining section) 55 that obtains a measured yaw rate of the vehicle, the vehicle speed sensor (vehicle speed detection section) 53 that detects a speed of the vehicle, the steering angle sensor (steering angle detection section) 26 that detects a steering angle of the steering wheel (steering member) 13, the steering angle reference yaw rate calculation section 91 that calculates a steering angle reference yaw rate by using the speed of the vehicle and the steering angle of the steering wheel (steering member) 13, the torque estimation device 73 that estimates, on the basis of the measured yaw rate or the steering angle reference yaw rate, the absolute value of which is smaller, and the speed of the vehicle, a self-aligning torque generated by a turning wheel of the vehicle and estimates a required assist torque on the basis of the estimated self-aligning torque, and the abnormality determination section 77 that determines whether or not the steering torque sensor 25 has entered an abnormal state.

If the abnormality determination section 77 determines that the steering torque sensor 25 has entered an abnormal state, the EPS control device 51 controls the drive of the assist motor 35 on the basis of the required assist torque estimated by the torque estimation device 73, in place of the steering torque detected by the steering torque sensor 25.

There are two purposes for the torque estimation device 73 to estimate a self-aligning torque on the basis of the measured yaw rate or the steering angle reference yaw rate, the absolute value of which is smaller, and the speed of the vehicle. The first purpose is to ensure the reliability of the electric power steering device II in a case where, for example, either of the measured yaw rate or the steering angle reference yaw rate exceeds a proper value. The second purpose is to prevent the steering wheel 13 from entering a self-steer state in a case where, for example, the vehicle travels and turns on a positive-cant road.

According to the electric power steering device 11 based on the first aspect, even in a case where the measured yaw rate or the steering angle reference yaw rate becomes an abnormal value (large value) compared with the proper value, the effects of the abnormal value can be avoided in advance, and thereby favorable steering sensation is sustained and the reliability of the electric power steering device 11 can be ensured.

In the electric power steering device 11 based on the first aspect, if the steering torque sensor 25 has entered an abnormal state, the EPS control device 51 controls the drive of the assist motor 35 on the basis of the required assist torque estimated by the torque estimation device 73, in place of the steering torque.

However, in a case where, for example, a steering angle of the steering wheel 13 is small, an output value of the measured yaw rate or the steering angle reference yaw rate becomes too small. In such a case, there is a problem in that it is unclear which control parameter is used to control drive of the assist motor 35.

Consequently, the electric power steering device 11 based on the second aspect further includes the EPS control device (rotation information obtaining section) 51 that obtains rotation information of the assist motor 35.

In the electric power steering device 11 based on the second aspect, if the steering torque sensor 25 is determined as having an abnormality by the abnormality determination section 77, the EPS control device 51 controls the drive of the assist motor 35 on the basis of the required assist torque estimated by the torque estimation device 73 and the rotation information of the assist motor 35 obtained by the EPS control device 51, in place of the steering torque detected by the steering torque sensor 25.

Note that, the rotation information of the assist motor 35 is information on the rotation of the assist motor, including both rotation angle information and rotation speed information of the assist motor 35. When the drive of the assist motor 35 is actually controlled on the basis of the rotation information of the assist motor 35, a well-known method, as disclosed in, for example, International Publication No. WO 2011/105154 (US2012/0312627), the entire contents of which are incorporated herein by reference, may be used.

According to the electric power steering device II based on the second aspect, an improved steering sensation is obtained in addition to the effects of operation of the electric power steering device II based on the first aspect.

[Other Embodiments]

It should be understood that the embodiments described above are only exemplary and should not be considered as limiting the technical scope of the present application. Variations are possible without departing from the gist and main features of the present application. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. An electric power steering device comprising:
   a steering torque detection section that detects a steering torque acting on a steering member;
   a drive control section that controls drive of an assist motor according to the steering torque detected by the steering torque detection section;
   a measured yaw rate obtaining section that obtains a measured yaw rate of a vehicle;
   a vehicle speed detection section that detects a speed of the vehicle;
   a steering angle detection section that detects a steering angle of the steering member;
   a steering angle reference yaw rate calculation section that calculates a steering angle reference yaw rate by using the speed of the vehicle and the steering angle of the steering member;
   a torque estimation device that estimates a self-aligning torque generated in a turning wheel of the vehicle, and estimates a required assist torque by using the estimated self-aligning torque, wherein the torque estimation device compares an absolute value of the measured yaw rate with an absolute value of the steering angle reference yaw rate, and selects one of the measured yaw rate and the steering angle reference yaw rate which has smaller absolute value, and estimates the self-aligning torque by using the speed of the vehicle and the selected one of the measured yaw rate and the steering angle reference yaw rate; and
   an abnormality determination section that determines whether or not the steering torque detection section is in an abnormal state,
   wherein, if the abnormality determination section determines that the steering torque detection section is in the abnormal state, the drive control section controls the drive of the assist motor using the required assist torque estimated by the torque estimation device, in place of the steering torque detected by the steering torque detection section.

2. The electric power steering device according to claim 1, further comprising:
   a rotation information obtaining section that obtains rotation information of the assist motor,
   wherein, if the abnormality determination section determines that the steering torque detection section is in the abnormal state, the drive control section controls the drive of the assist motor using the required assist torque estimated by the torque estimation device and the rotation information of the assist motor obtained by the rotation information obtaining section, in place of the steering torque detected by the steering torque detection section.

3. The electric power steering device according to claim 1, wherein the required assist torque is a torque to cancel the estimated self-aligning torque.

4. The electric power steering device according to claim 1, wherein the drive control section controls the drive of the assist motor to provide an assist force to the steering member.

5. The electric power steering device according to claim 1, wherein the drive control section controls the drive of the assist motor using a torque electric current corresponding to the required assist torque estimated by the torque estimation device, and
   if the abnormality determination section determines that the steering torque detection section is in the abnormal state, the drive control section gradually increase the torque electric current in a predetermined delay time period.

6. The electric power steering device according to claim 5, wherein the delay time period is variably set in accordance with magnitude of an absolute value of the required assist torque.

7. The electric power steering device according to claim 2, wherein the rotation information of the assist motor includes rotation angle and rotation speed of the assist motor.

8. A vehicle comprising the electric power steering device according to claim 1.

9. An electric power steering device comprising:
a steering torque detector that detects a steering torque acting on a steering member;
a controller configure to control drive of an assist motor according to the steering torque detected by the steering torque sensor so as to provide assist force to the steering member;
a yaw rate detector that obtains a yaw rate of a vehicle;
a vehicle speed detector that detects a speed of the vehicle;
a steering angle detector that detects a steering angle of the steering member,
wherein the controller calculates a steering angle reference yaw rate by using the speed of the vehicle and the steering angle of the steering member,
wherein the controller estimates a self-aligning torque generated in a turning wheel of the vehicle steered by the steering member, and estimates a required assist torque using the estimated self-aligning torque,
wherein the controller compares an absolute value of the obtained yaw rate with an absolute value of the steering angle reference yaw rate, and selects one of the obtained yaw rate and the steering angle reference yaw rate which has smaller absolute value, and estimates the self-aligning torque by using the speed of the vehicle and the selected one of the obtained yaw rate and the steering angle reference yaw rate,
wherein the controller determines whether or not the steering torque detector is in an abnormal state,
wherein, if it is determined that the steering torque detector is in the abnormal state, the controller controls the drive of the assist motor using the estimated required assist torque, in place of the steering torque detected by the steering torque detector.

* * * * *